F. H. JONES.
CHURN.
APPLICATION FILED NOV. 27, 1918.

1,384,665.

Patented July 12, 1921.

Inventor
Fred H. Jones,
By
Attorney

UNITED STATES PATENT OFFICE.

FRED H. JONES, OF ZANESVILLE, OHIO.

CHURN.

1,384,665.  Specification of Letters Patent.  Patented July 12, 1921.

Application filed November 27, 1918. Serial No. 264,386.

*To all whom it may concern:*

Be it known that I, FRED H. JONES, citizen of the United States of America, residing at Zanesville, in the county of Muskingum and State of Ohio, have invented new and useful Improvements in Churns, of which the following is a specification.

The purpose of the invention is to provide the new and novel form of churn in which the churning operation may be mechanically performed. To this end the invention comprises the sliding base mounted on top of a relatively long casing designed for the purpose of holding milk vessels. On the sliding base there is mounted a motor which may be thrown into and out of gear with a churn dasher, the latter being carried in a can positioned intermediately between the ends of the casing, the can receiving the milk to be churned.

Other and further purposes of the invention appear in the following description wherein the same is set forth in detail.

To the exact construction in which it is shown and described, the invention is not to be restricted. The right is reserved to make such changes or alterations as the actual reduction to practice may suggest in so far as such changes or alterations will comprehend in spirit by the annexed claim.

Figure 1:
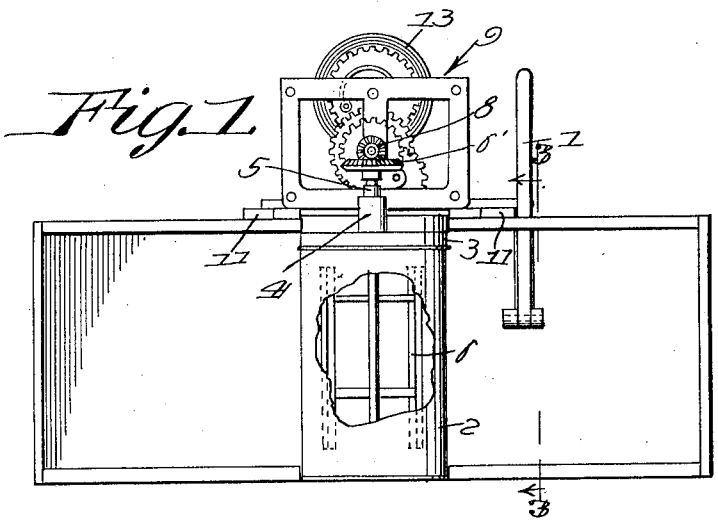
Figure 1 is a view in front elevation of the improved churn.
Figure 2:
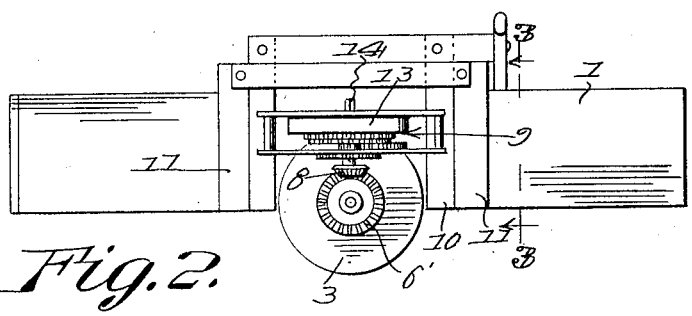
Fig. 2 is a top plan view.
Figure 3:
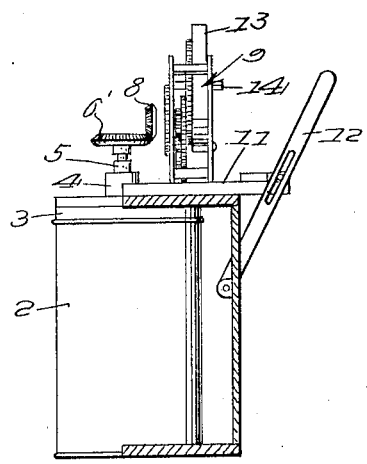
Fig. 3 is a section on the line 3—3 of Fig. 2.

Referring to the drawings, there is shown a casing 1 made preferably in the form of a rectangular parallelepiped. Both the bottom and top of the this casing are cut away at their longitudinal centers to provide a place in which the can 2 may be positioned, the space in the casing to either side of the can providing places for milk receptacles. The can 2 is closed at the top by cover member 3 formed with upstanding bearing number 4 through which bearing number 4 projects a staff 5, the latter carrying interior to the can a dasher 6.

On the exterior or upper end of the staff 5 there is carried a bevel gear 6 which may be thrown into or out of mesh with a bevel pinion 8 carried on the shaft of a spring motor 9.

The spring motor is mounted on a base 10 movable between slides 11, the latter being carried on top of the casing 1. Pivotally connected with the base 10 there is a lever 12, the latter having one end pivotally attached to the casing 1 and the other end terminating in a handle 2 that the lever may be oscillated on its connection with the casing as a pivot, thereby providing for moving the base 10 and with which the motor 9 toward and away from the staff 5.

The energy of the motor is provided by a spring 13 having a winding element 14 by which it may be wound up when run down.

It is obvious how, when the can 2 is supplied with a quantity of milk and the cover 3 in place thereon, the dasher may be rotated by means of the motor 9 by inter-meshing the gears of the motor and the dasher, this of course being accomplished by operating the lever 12 so as to move the motor toward the dasher staff 5. So soon as the churn operation has been performed, the motor may be removed from the dasher staff, in which position the cover 3 may be removed from the can 2 and the churned product removed therefrom.

From the foregoing description and the accompanying drawings, it is believed that a clear enough understanding is to be had to render further description unnecessary.

The invention having been described, what is claimed as new and useful is:

A device for the purpose indicated comprising a supporting member, a driving element, a gear carried by the driving element, a spring motor carrying a gear for meshing with the last said gear, a base on which the motor is carried, slides mounted on top of the supporting member and engaging the base to permit sliding movement of the latter, and a hand lever secured to the supporting member by a pivotal connection at one end of the lever, the lever having an operative connection with the base whereby swinging movement of the lever may impart sliding movement of the base to shift the gear on the motor into and out of mesh with the gear on the driving element.

In testimony whereof I affix my signature.

FRED H. JONES.